(12) United States Patent
Haga

(10) Patent No.: US 8,570,366 B2
(45) Date of Patent: Oct. 29, 2013

(54) 3D IMAGE CONTROL APPARATUS AND CONTROL METHOD THEREOF

(75) Inventor: Minoru Haga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 13/025,063

(22) Filed: Feb. 10, 2011

(65) Prior Publication Data

US 2011/0199467 A1   Aug. 18, 2011

(30) Foreign Application Priority Data

Feb. 12, 2010  (JP) ................. 2010-029282

(51) Int. Cl.
*H04N 9/47* (2006.01)
*H04N 13/00* (2006.01)

(52) U.S. Cl.
USPC .................................. 348/56; 348/53; 348/43

(58) Field of Classification Search
USPC ....................................... 348/53, 43
See application file for complete search history.

(56) References Cited

U.S. PATENT DOCUMENTS

| 8,269,822 B2 * | 9/2012 | Zalewski | 348/56 |
| 2010/0194857 A1 * | 8/2010 | Mentz et al. | 348/43 |
| 2010/0207954 A1 * | 8/2010 | Kim | 345/589 |
| 2011/0164122 A1 * | 7/2011 | Hardacker | 348/53 |

FOREIGN PATENT DOCUMENTS

| JP | 2000-275575 A | 10/2000 |
| JP | 2010-062767 A | 3/2010 |

* cited by examiner

*Primary Examiner* — Joseph Ustaris
*Assistant Examiner* — Rebecca Volentine
(74) *Attorney, Agent, or Firm* — Canon U.S.A., Inc. IP Division

(57) ABSTRACT

A 3D image control apparatus receives from shutter glasses an identification signal for identifying a type of the shutter glasses, reading a shutter opening and closing characteristic of the shutter glasses of the type identified based on the identification signal from a storage unit storing shutter characteristics of the shutter glasses in association with the type of the shutter glasses. The 3D image control apparatus controls display timing of an image display unit based on the shutter opening and closing characteristic in such a manner that display periods of the right eye image and the left eye image are respectively within opening periods of the right shutter and the left shutter.

6 Claims, 4 Drawing Sheets

FIG. 2A

| SHUTTER GLASSES TYPE | OPENING AND CLOSING CHARACTERISTICS [ms] | |
|---|---|---|
| | OPEN→CLOSE | CLOSE→OPEN |
| SHUTTER GLASSES A | 2 | 2 |
| SHUTTER GLASSES B | 3 | 2 |
| SHUTTER GLASSES C | 4 | 3 |
| ～ | ～ | ～ |
| SHUTTER GLASSES X | 3 | 3 |

FIG. 2B

| SHUTTER GLASSES TYPE | TRANSMISSION FACTORS [%] |
|---|---|
| SHUTTER GLASSES A | 60 |
| SHUTTER GLASSES B | 50 |
| SHUTTER GLASSES C | 40 |
| ～ | ～ |
| SHUTTER GLASSES X | 50 |

FIG. 2C

| SHUTTER GLASSES TYPE | TRANSMISSION COLOR TEMPERATURES R:G:B RATIO (%) | | |
|---|---|---|---|
| | R | G | B |
| SHUTTER GLASSES A | 50 | 60 | 70 |
| SHUTTER GLASSES B | 40 | 50 | 60 |
| SHUTTER GLASSES C | 30 | 40 | 50 |
| ～ | ～ | ～ | ～ |
| SHUTTER GLASSES X | 40 | 50 | 60 |

WHEN IMAGE DISPLAY
APPARATUS OF FIELD
SEQUENTIAL METHOD
IS USED

WHEN IMAGE DISPLAY
APPARATUS OF LINE
SEQUENTIAL METHOD
IS USED

3D IMAGE CONTROL APPARATUS AND CONTROL METHOD THEREOF

BACKGROUND OF THE INVENTION

1. Field of the Invention

The present invention relates to a three-dimensional (3D) image control apparatus and a control method thereof.

2. Description of the Related Art

A 3D image viewing system capable of providing 3D images to the viewer is known that alternately displays right eye images and left eye images in a time-division manner to enable the viewer to view images through shutter glasses alternately opening and closing a right shutter and a left shutter in synchronization with switching of the display.

In a 3D image display system of such a field sequential (FS) method, shutter characteristics of the shutter glasses are to be improved so that a user effectively can view a 3D image. Japanese Patent Application Laid-Open No. 2000-275575 discusses liquid crystal shutter glasses having a transmittance improved by using a light scattering type liquid crystal device.

In the past, for a three dimensional television set (3DTV) capable of providing 3D images to the viewer, it has been popular for the viewer to view images using shutter glasses dedicated for the type of a television set. However, along with popularization of 3DTVs, since various types of shutter glasses have become popular, non-dedicated glasses have been increasingly used to view the images. Further, when a plurality of users view program images displayed on a single 3DTV, the dedicated glasses and the non-dedicated glasses can be used at a time.

However, since the shutter glasses for the conventional 3DTV used by users have been supposed to be the dedicated glasses, the conventional 3DTV cannot discriminate whether the shutter glasses are the dedicated glasses or the non-dedicated glasses. Further, since the dedicated glasses and the non-dedicated glasses often have different shutter characteristics, when the user views the images using the non-dedicated glasses, crosstalk of the viewing image may be more generated or the luminance may be lowered compared with when using the dedicated glasses.

SUMMARY OF THE INVENTION

According to an aspect of the present invention, an apparatus configured to enable viewing a 3D image by causing a display unit to alternately display a right eye image and a left eye image in a time-division manner and alternately opening and closing right and left shutters of shutter glasses includes a communication unit configured to transmit to the shutter glasses a signal synchronized with switching between the right eye image and the left eye image and to receive from the shutter glasses an identification signal for identifying a type of the shutter glasses, a storage unit configured to store shutter characteristics of the shutter glasses in association with the type of the shutter glasses, and a control unit configured to read from the storage unit a shutter opening and closing characteristic included in the shutter characteristics based on the identification signal and to control display timing of the display unit based on the shutter opening and closing characteristic such that display periods of the right eye image and the left eye image are within opening periods of the right shutter and the left shutter, respectively.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C illustrate shutter characteristics of shutter glasses according to an exemplary embodiment of the present invention.

DESCRIPTION OF THE EMBODIMENTS

Various exemplary embodiments, features, and aspects of the invention will be described in detail below with reference to the drawings.

Figure 1:
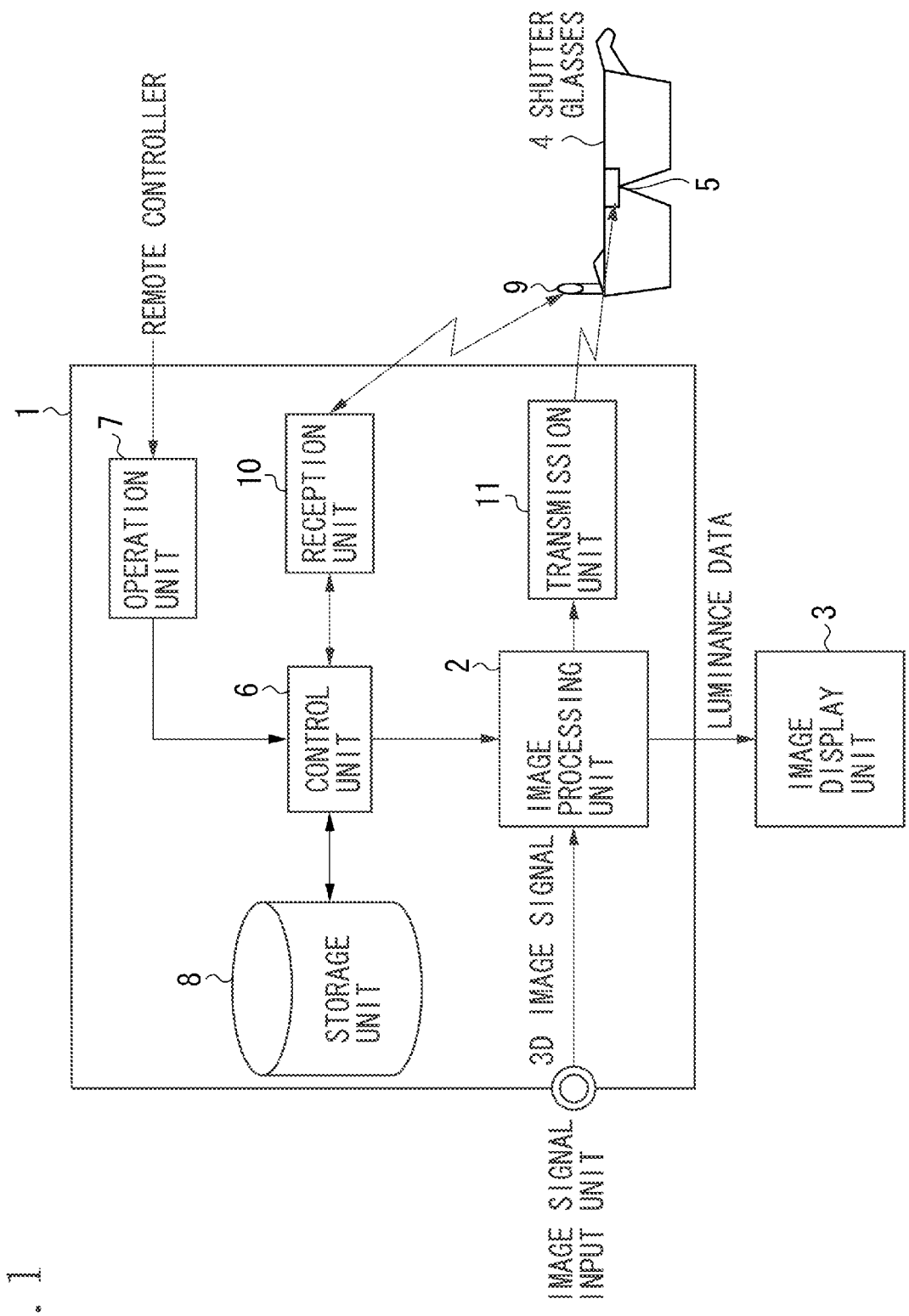
FIG. 1 is a block diagram illustrating a 3D image viewing system according to an exemplary embodiment of the present invention.

FIG. 1 is a block diagram illustrating a 3D image viewing system according to a first exemplary embodiment of the present invention, which includes a 3D image control apparatus 1, an image display unit 3, and shutter glasses 4 (hereafter, referred to as "glasses"). The 3D image control apparatus 1 is any one of a video recorder, a set top box (STB), or a 3DTV integrated with the image display unit 3.

An input 3D image signal is separated by an image processing unit 2 into a right eye image signal, a left eye image signal, and a synchronizing signal for controlling shutter glasses (hereafter, referred to as "synchronizing signal"). The synchronizing signal is transmitted from a transmission unit 11 to a synchronizing signal reception unit 5 of the glasses 4 via a communication medium of infrared communication or wireless communication. A control unit (not illustrated) of the glasses 4 controls opening and closing of right and left shutters in synchronization with the received synchronizing signal.

Based on the input 3D image signal, the image processing unit 2 generates luminance data for displaying a 3D image conforming to the specifications of the image display unit 3. Based on the luminance data, the image display unit 3 alternately displays a right eye image and a left eye image in a time-division manner, and the glasses 4 alternately open and close the right and left shutters in synchronization with switching of the right eye image and the left eye image.

A control unit 6 acquires shutter characteristics of the glasses 4. The shutter characteristics include shutter opening and closing characteristics, transmittances, and transmission color temperatures. As illustrated in FIG. 2A, the opening and closing characteristic is a time when the transmittance changes from 90% to 10% when the shutter is opened ("open to close" time), and a time when the transmittance changes from 10% to 90% ("close to open" time). As illustrated in FIG. 2B, the transmittance indicates the transmittance when the shutter is opened. As illustrated in FIG. 2C, the transmission color temperature indicates the transmittance for each of RGB components when the shutter is opened.

The shutter characteristics are acquired as follows. A read only memory (ROM) (storage unit) 8 previously stores the shutter characteristics of various types of glasses A, B, C to x as a table in which the shutter characteristics are associated with the types of glasses, as illustrated FIGS. 2A, 2B, and 2C. When the user performs an operation for viewing 3D content via a remote controller of the 3D image control apparatus 1, an identification signal of the glasses 4 is transmitted from a transmission unit 9 of the glasses 4 to a reception unit 10 of the 3D image control apparatus 1 via the communication medium.

The identification signal may be transmitted in conjunction with the operation of selecting a station when the user selects a 3D broadcasting program. Based on the identification signal, the control unit 6 identifies a type of the glasses 4 and reads the shutter characteristics of the identified glasses 4 from the storage unit 8. Then, the control unit 6 controls the image processing unit 2 based on the shutter characteristics of the identified glasses 4. The transmission unit 11 and the reception unit 10 are integrated with each other as a communication interface (communication unit).

The shutter characteristic table is stored in the storage unit 8 when products of the 3D image control apparatus 1 are shipped out. However, the user can update the shutter characteristic table by controlling an external input unit or a tuner (not illustrated) to enable the control unit 6 to download the shutter characteristic table at a predetermined timing via a network or broadcast signals.

Based on an instruction by the control unit 6, the image processing unit 2 performs image processing as follows according to the shutter characteristics.

(1) Display Timing Control

Figure 3A:
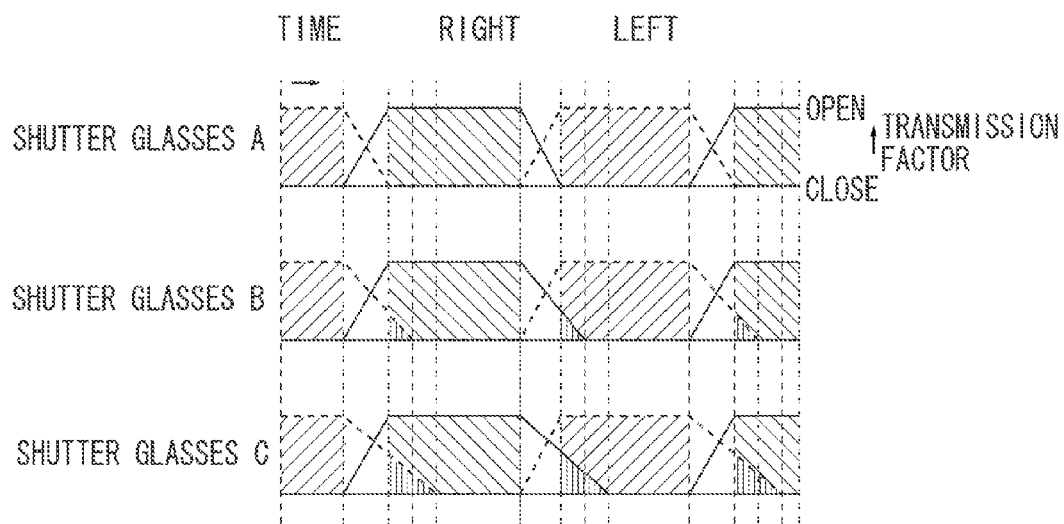
FIGS. 3A and 3B illustrate opening and closing timings of the shutter glasses according to an exemplary embodiment of the present invention.
Figure 3B:
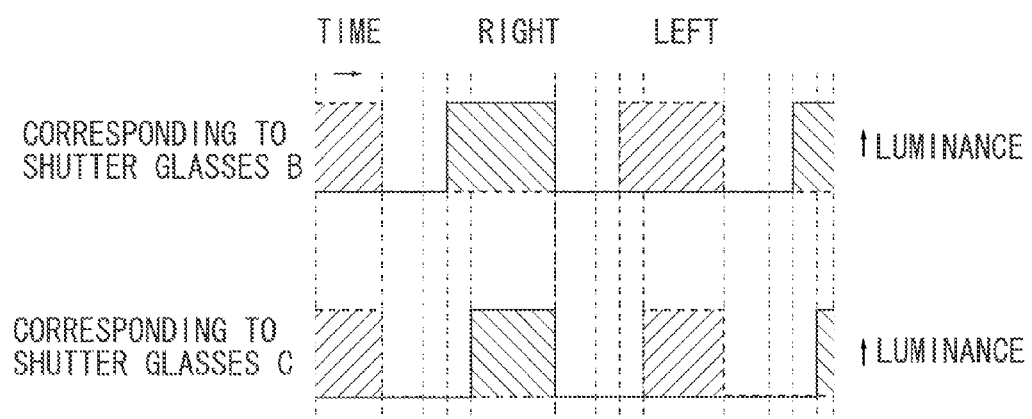

The image processing unit 2 controls the display timing of a right eye image and a left eye image displayed on the image display unit 3. With reference to FIGS. 3A and 3B, relationships between the opening and closing timing of the shutter of the glasses and the display timing of the right eye image and the left eye image will be described. Solid lines indicate the opening and closing timing of the right shutter, and broken lines indicate the opening and closing timing of the left shutter. FIG. 3A illustrates the opening and closing timings of dedicated glasses "A" and non-dedicated glasses "B" and "C". The non-dedicated glasses "B" and "C" have the characteristics in which an "open to close" time is longer compared with that of the dedicated glasses "A" (refer to FIG. 2A). In FIGS. 3A and 3B, parts having diagonally right down lines therein indicate periods for displaying the right eye images and parts having diagonally right up lines therein indicate periods for displaying the left eye images.

When the glasses used by the user are identified as the dedicated glasses "A", as illustrated in FIG. 3A, each display period for the right eye and the left eye synchronizes with the opening and closing timing of the glasses "A". At this point, according to the opening and closing timings of the glasses "B" or "C", a part of the "open to close" period of the shutter overlaps a part of the period for displaying an other-eye image (parts having vertical lines therein). More specifically, the left eye image is displayed in a part of the "open" period of the right shutter.

Figure 4A:
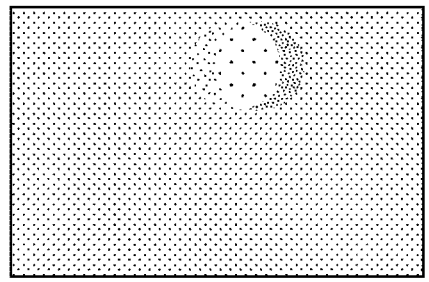
FIGS. 4A and 4B are schematic diagrams illustrating degradation of image quality of viewed images.
Figure 4B:
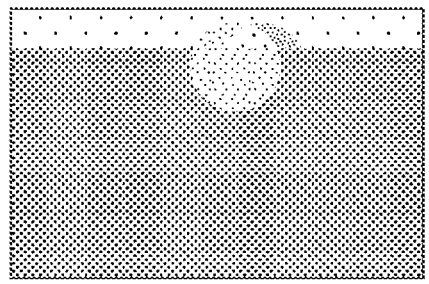

With this state, in the image viewed by the user through the glasses "B" or "C", image crosstalk such as that illustrated in FIG. 4A or 4B may be generated. When a plasma display panel (PDP) (field sequential method) is used as the image display unit 3, as illustrated in FIG. 4A, the other-eye image looks mixed anywhere in the entire screen. Further, when a liquid crystal display apparatus (LCD) (line sequential method) is used as the image display unit 3, as illustrated in FIG. 4B, much part of the other-eye image looks mixed at an upper portion of the screen.

The "open" period of the shutter indicates a period from a point when rising of the transmittance during the "close to open" period has completed to a point when falling of the transmittance during the "open to close" period begins.

On the other hand, FIG. 3B illustrates the image display period when the glasses used by the user are identified as the glasses "B" or "C". According to the opening and closing timing of the identified glasses, the image display period is adjusted. More specifically, the display period is shortened so that the display of the other-eye image is started in synchronization with the ending timing of the "open to close" period. With such control, the display periods of the right eye image and the left eye image can be respectively within the "open" periods of the right shutter and the left shutter.

Further, when it is determined that the glasses "A", "B", and "C" are used at a time, the image display period is shortened so that the display of the other-eye image is started in synchronization with the ending timing of the "open to close" timing of the glasses "C", which has the characteristic of the longest "open to close" period. An adjustment of the display period is performed by controlling a lighting period of the light emitting diode (LED) back light for LCD, a sustaining period for PDP, and a blank period for FED.

Further, as illustrated in FIG. 3B, since the display luminance is lowered if the display period is shortened, a luminance value of the image display unit 3 can be increased according to a shortened amount of the display period. At this point, an integral value of the luminance value with respect to the display period is controlled to be the same value after and before the adjustment.

As described above, by adjusting the display period of the right and left eye images according to the opening and closing timings of various types of glasses, even when the non-dedicated glasses are used, image crosstalk can be avoided.

(2) Transmittance Control

The image processing unit 2 controls the display luminance of the right eye image and the left eye image displayed on the image display unit 3. As illustrated in FIG. 2, the shutter transmittance varies depending on a type of the glasses 4. The image processing unit 2 sets the display luminance to be matched with the transmittance (60%) of the dedicated glasses "A" as a default value.

When the glasses used by the user are identified as the glasses "B", since the transmittance of the glasses "B is lowered compared with that of the glasses "A", the display luminance of the image display unit 3 is increased according to a lowered amount of the transmittance. More specifically, since the transmittance of the glasses "B" is 50%, the image processing unit 2 controls the image display unit 3 so that the display luminance becomes 1.2 times the default value. The display luminance is controlled by correcting the luminance data output to the image display unit 3 based on the input 3D image signal. Further, for the LCD, the luminance of the back light may be controlled.

Furthermore, when it is determined that the glasses "A", "B", and "C" are used at a time, the display luminance is adjusted to be matched with the average transmittance of the glasses "A", "B", and "C".

As described above, by adjusting the display luminance according to the shutter transmittance of the various types of glasses, even when the user views the images using the non-dedicated glasses, the user can view the images with the same luminance as that when using the dedicated glasses. Further, even when a plurality of types of glasses are used at a time, the luminance difference occurring between the viewed images via the various glasses used can be decreased.

(3) Transmission Color Temperature Control

The image processing unit 2 can also control the display luminance of the right eye image and the left eye image displayed on the image display unit 3 for each of red, green, and blue (RGB) colors. As illustrated in FIG. 2C, depending on the type of the glasses, the shutter transmission color temperature, which is the shutter transmittance for each of RGB colors, varies depending on the type of glasses. More specifically, a color tone of the image seems different depending on the type of the glasses 4. The luminance data is previously corrected for each of RGB colors to be matched with the transmission color temperature of the dedicated glasses "A" as a default value.

When the glasses used by the user are identified as the glasses "B", the luminance data for each of RGB colors is corrected according to the ratio of the transmission color temperature of the glasses "B" to that of the glasses "A". More specifically, the image processing unit 2 multiplies the default value of the "R" luminance data by 1.25, that of the "G" luminance data by 1.20, and that of the "B" luminance data by 1.17.

Further, when it is determined that the glasses A, B, and C are used at a time, the luminance data is corrected to be matched with the average transmission color temperature of the glasses A, B, and C.

As described above, by adjusting the display luminance for each of RGB colors to be matched with each transmission color temperature for various types of glasses, even when the user views the images using the non-dedicated glasses, the user can view the images with the same luminance as when using the dedicated glasses. Further, even when a plurality of types of glasses are used at a time, the luminance difference occurring between the viewed images via the various glasses used can be decreased.

According to a second exemplary embodiment of the present invention, the dedicated glasses "A" do not include the transmission unit 9 for transmitting an identification signal. When the user transmits an instruction for viewing 3D content, or when the user selects a 3D broadcasting program, the control unit 6 recognizes that the dedicated glasses "A" are selected and controls the image processing unit 2 accordingly. The image processing unit 2 sets the image display period, the transmittance, and the transmission color temperature to the respective default values for the dedicated glasses "A" and generates luminous data based on the default values.

When the glasses other than the dedicated glasses "A" are used, the user separately operates the remote controller to inform the apparatus of a use of the non-dedicated glasses. An operation performed by the 3D image control apparatus 1 when the non-dedicated glasses are used is similar to that of the first exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-029282 filed Feb. 12, 2010, which is hereby incorporated by reference herein in its entirety.

What is claimed is:

1. An apparatus that configured to enable viewing a 3D image by causing a display unit to alternately display a right eye image and a left eye image in a time-division manner and alternately opening and closing right and left shutters of shutter glasses, the apparatus comprising:
a communication unit configured to transmit to the shutter glasses a signal synchronized with switching between the right eye image and the left eye image and to receive from the shutter glasses an identification signal for identifying a type of the shutter glasses;
a storage unit configured to store shutter characteristics of the shutter glasses in association with the type of the shutter glasses; and
a control unit configured to read from the storage unit a shutter opening and closing characteristic included in the shutter characteristics based on the identification signal and to control display timing of the display unit based on the shutter opening and closing characteristic such that display periods of the right eye image and the left eye image are within opening periods of the right shutter and the left shutter, respectively,
wherein the control unit controls the display unit to adjust a display luminance of each of red, green, and blue (RGB) colors of the right eye image and the left eye image based on a shutter transmission color temperature included in the shutter characteristics based on the identification signal.

2. The apparatus according to claim 1, wherein the control unit controls the display unit to increase a display luminance of the right eye image and the left eye image by a value corresponding to a shortened amount of the display period of the right eye image and the left eye image with respect of default values of a display period and display luminance that have previously been determined for dedicated glasses.

3. The apparatus according to claim 1, wherein the control unit controls the display unit to adjust a display luminance of the right eye image and the left eye image based on a shutter transmittance included in the shutter characteristics based on the identification signal.

4. A method for controlling an apparatus configured to enable viewing a 3D image by causing a display unit to alternately display a right eye image and a left eye image in a time-division manner and alternately opening and closing right and left shutters of shutter glasses, the method comprising:
transmitting the shutter glasses a signal synchronized with switching between the right eye image and the left eye image and receiving from the shutter glasses an identification signal for identifying a type of the shutter glasses;
storing, in a storage unit, shutter characteristics of the shutter glasses in association with the type of the shutter glasses;
reading from the storage unit a shutter opening and closing characteristic included in the shutter characteristics based on the identification signal and controlling display timing of the display unit based on the shutter opening and closing characteristic such that display periods of the right eye image and the left eye image are within opening periods of the right shutter and the left shutter, respectively; and
adjusting a display luminance of each of red, green, and blue (RGB) colors of the right eye image and the left eye image based on a shutter transmission color temperature included in the shutter characteristics based on the identification signal.

5. The method according to claim 4, further comprising increasing a display luminance of the right eye image and the left eye image by a value corresponding to a shortened amount of the display period of the right eye image and the left eye image with respect of default values of a display period and displaying luminance that have previously been determined for dedicated glasses.

6. The method according to claim 4, further comprising adjusting a display luminance of the right eye image and the left eye image based on a shutter transmittance included in the shutter characteristics based on the identification signal.

* * * * *